(12) United States Patent
Haines et al.

(10) Patent No.: US 11,596,151 B2
(45) Date of Patent: Mar. 7, 2023

(54) COMPOSITIONS FOR THE PROTECTION OF AGRARIAN CROPS AND USE THEREOF

(71) Applicant: STICHTING I-F PRODUCT COLLABORATION, Amsterdam (NL)

(72) Inventors: Robbie Moss Haines, Evesham (GB); Charlie James Flood, Evesham (GB); Hong Zhang, Cary, NC (US); David Bird, Randolph, NJ (US); Laibin B. Yan, North Wales, PA (US); Frank J. Zawacki, Yardley, PA (US); Claudio Dacarro, Milan (IT); Elisa Galimberti, Lissone (IT); Ilenia Mazzali, Novara (IT)

(*) Notice: Subject to any disclaimer, the term of this patent is extended or adjusted under 35 U.S.C. 154(b) by 0 days.

(21) Appl. No.: 16/219,466

(22) Filed: Dec. 13, 2018

(65) Prior Publication Data

US 2019/0364897 A1 Dec. 5, 2019

Related U.S. Application Data

(60) Provisional application No. 62/599,540, filed on Dec. 15, 2017.

(51) Int. Cl.
| | |
|---|---|
| *A01N 43/56* | (2006.01) |
| *A01N 25/04* | (2006.01) |
| *A01N 25/30* | (2006.01) |
| *A01N 43/653* | (2006.01) |

(52) U.S. Cl.
CPC ............. *A01N 43/56* (2013.01); *A01N 25/04* (2013.01); *A01N 25/30* (2013.01); *A01N 43/653* (2013.01)

(58) Field of Classification Search
CPC ........ A01N 43/56; A01N 25/04; A01N 25/30; A01N 43/653
See application file for complete search history.

(56) References Cited

U.S. PATENT DOCUMENTS

| | | | |
|---|---|---|---|
| 2015/0164076 A1* | 6/2015 | Pellacini | A01N 47/38 424/633 |
| 2016/0183526 A1* | 6/2016 | Hopkins | A01N 43/653 514/336 |

FOREIGN PATENT DOCUMENTS

| | | |
|---|---|---|
| CL | 201403357 | 2/2015 |
| EP | 0453899 A1 | 10/1991 |
| JP | 2016065043 A | 4/2016 |
| WO | 2008145063 A1 | 12/2008 |
| WO | 2012084812 A1 | 6/2012 |
| WO | 2013167545 A1 | 11/2013 |
| WO | 2013167549 A1 | 11/2013 |
| WO | 2014083012 A1 | 6/2014 |
| WO | 2019007717 A1 | 1/2019 |
| WO | 2019007719 A1 | 1/2019 |

OTHER PUBLICATIONS

Safety Data Sheet for Anique AMD 810 (revised May 29, 2015, downloaded from the web Dec. 6, 2021 (Year: 2015).*
Marie, Gerard, "Communication pursuant to Article 94(3) EPC in European Patent Application No. 18 830 605.4," Examining Division, European Patent Office, dated Sep. 20, 2021.
"Communication pursuant to Rule 114(2) EPC—Third Party Observation for Application No. EP20180830605," European Patent Office, dated Sep. 9, 2021.
Francisco Agustín Romero Oliva, "Informe De Búsqueda for Chilean Patent Application No. 202001500," Nstituto Nacional De Propiedad Industrial—INAPI, Jul. 29, 2021.
Francisco Agustin Romero Oliva, "INFORME PERICIALfor Chilean Patent Application No. 202001500," Instituto Nacional De Propiedad Industrial—INAPI, Jul. 29, 2021.
Marie, Gérald, "International Search Report for International Application No. PCT/US2018/065485," European Patent Office, Feb. 18, 2019.

* cited by examiner

Primary Examiner — Kortney L. Klinkel
Assistant Examiner — Jason Deck
(74) Attorney, Agent, or Firm — Florek & Endres PLLC

(57) ABSTRACT

An emulsifiable concentrate may include: an aminoindane amide having the structure of formula (I); and an amide having the structure of formula (II); wherein $R^1$, $R^2$, $R^3$, $R^4$, $R^5$, $R^6$, $R^7$, $R^8$, $R^{11}$, $R^{12}$, $R^{13}$, and n are as defined herein, as well as to formulations containing the same, and to methods of their preparation and use for treatment and protection of agricultural crops.

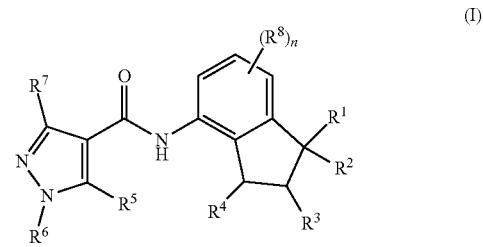

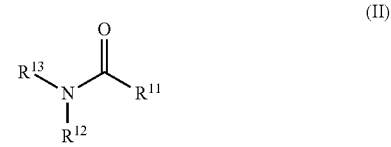

38 Claims, No Drawings

COMPOSITIONS FOR THE PROTECTION OF AGRARIAN CROPS AND USE THEREOF

CROSS-REFERENCE TO RELATED APPLICATION(S)

This application is a national stage entry from International Application No. PCT/US2018/065485, filed on Dec. 13, 2018, in the Receiving Office ("RO/US") of the U.S. Patent and Trademark Office ("USPTO"), published as International Publication No. WO 2019/118743 A1 on Jun. 20, 2019; International Application No. PCT/US2018/065485 claims priority under 35 U.S.C. § 119 from U.S. Provisional Patent Application No. 62/599,540, filed on Dec. 15, 2017, in the USPTO.

BACKGROUND

Technical Field

The present invention relates to compositions for the protection of agricultural crops and uses thereof.

Description of the Related Art

Compositions of fungicidal aminoindane amide compounds alone and in combination with fungicidal azole compounds are described in WO 2013/186325. Emulsifiable concentrates are widely used formulations in crop protection. The disadvantage of known emulsifiable concentrates is poor stability at cold temperatures, active ingredient crystallization, and low active ingredient concentration. The present invention provides an emulsifiable concentrate that addresses these disadvantages and surprisingly allows for high fungicide concentration without crystallization.

BRIEF SUMMARY

The present invention is directed to emulsifiable concentrates of compounds for the protection of agricultural crops, to formulations containing the same, and to methods of their preparation and use for treatment and protection of agricultural crops.

In an embodiment, an emulsifiable concentrate is provided with an aminoindane amide compound having the structure of formula (I):

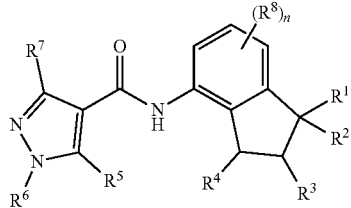

(I)

and an amide having the structure of formula (II):

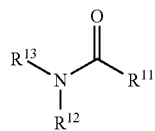

(II)

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, and n are as defined below.

In an embodiment, an emulsifiable concentrate is provided with an aminoindane amide compound-of formula (I), an amide compound of formula (II), and an azole compound having fungicidal or insecticidal activity.

In an embodiment, a formulation is provided wherein the emulsifiable concentrate is emulsified in water.

In an embodiment, a method of controlling pathogenic fungi in agricultural crops is provided by applying an effective dose of the emulsifiable concentrate or an effective dose of a formulation of the present invention on a plant to be protected, on seeds of a plant to be protected before sowing, or on the ground before sowing seeds of a plant to be protected.

In an embodiment, a method of controlling harmful insects in agricultural crops is provided by applying an effective dose of the emulsifiable concentrate or an effective dose of a formulation of the present invention on a plant to be protected, on seeds of a plant to be protected before sowing, or on the ground before sowing seeds of a plant to be protected.

DETAILED DESCRIPTION

As mentioned above, the invention relates to emulsifiable concentrates of compounds for the protection of agricultural crops, to formulations containing the same, and to methods of their preparation and use for treatment and protection of agricultural crops.

In an embodiment, an emulsifiable concentrate is provided with:

a) an aminoindane amide having the structure of formula (I):

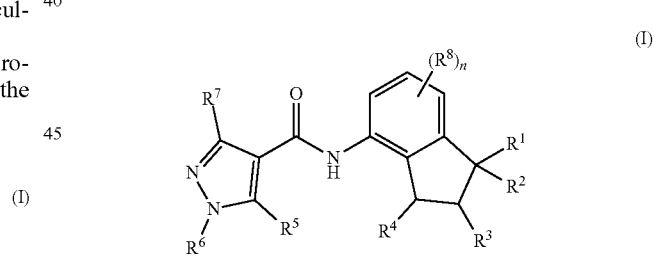

(I)

wherein $R^1$, $R^2$, $R^3$, and $R^4$ are each, independently, H, $C_{1-4}$alkyl. $C_{1-4}$haloalkyl, $C_{3-6}$cycloalkyl, or $C_{3-6}$halocycloalkyl;

$R^5$ and $R^7$ are each, independently, H, $C_{1-4}$alkyl, or $C_{1-4}$haloalkyl;

$R^6$ is $C_{1-4}$alkyl, $C_{1-4}$haloalkyl, $C_{3-6}$cycloalkyl, $C_{3-6}$halocycloalkyl, $C_{1-4}$alkoxy, $C_{1-4}$haloalkoxy, $C_{1-4}$alkylthio, or $C_{1-4}$haloalkylthio;

$R^8$ is halo, —OH, —SH, $C_{1-4}$alkyl, $C_{1-4}$haloalkyl, $C_{1-4}$alkoxy, $C_{1-4}$haloalkoxy, $C_{1-4}$alkylthio, or $C_{1-4}$haloalkylthio; and n is 0 to 3; and b) an amide having the structure of formula (II):

wherein
R$^{11}$ is C$_{5-19}$alkyl;
R$^{12}$ is C$_{1-4}$alkyl; and
R$^{13}$ is C$_{1-4}$alkyl.

As used herein, "alkyl" means a straight chain or branched alkyl group having from 1 to 20 carbon atoms (i.e., C$_{1-20}$alkyl), in some embodiments from 1 to 8 carbon atoms (i.e., C$_{1-8}$alkyl), in some embodiments from 1 to 6 carbon atoms (i.e., C$_{1-6}$alkyl), in some embodiments from 1 to 4 carbon atoms (i.e., C$_{1-4}$alkyl), and in some embodiments from 1 to 2 carbon atoms (i.e., C$_{1-2}$alkyl). Examples of straight chain alkyl groups include, but are not limited to, methyl, ethyl, n-propyl, n-butyl, n pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups.

"Halo" or "halogen" refers to fluorine, chlorine, bromine, and iodine.

"Haloalkyl" refers to an alkyl as defined above with one or more hydrogen atoms replaced with halogen. Examples of haloalkyl groups include, but are not limited to, —CF$_3$, —CHF$_2$, —CH$_2$F, —CH$_2$CF$_3$ and the like.

"Alkoxy" refers to an alkyl as defined above joined by way of an oxygen atom (i.e., —O-(alkyl)). Examples of alkoxy groups include, but are not limited to, methoxy, ethoxy, n-propoxy, n-butoxy, isopropoxy, sec-butoxy, tert-butoxy, and the like.

"Haloalkoxy" refers to a haloalkyl as defined above joined by way of an oxygen atom (i.e., —O-(haloalkyl)). Examples of haloalkoxy groups include, but are not limited to, —OCF$_3$, —OCHF$_2$, —OCH$_2$F, —OCH$_2$CF$_3$, and the like.

"Alkylthio" refers to an alkyl as defined above joined by way of a sulfur atom (i.e., —S-(alkyl)). Examples of alkylthio groups include, but are not limited to, —SCH$_3$ and —SCH$_2$CH$_3$.

"Haloalkylthio" refers to a haloalkyl as defined above joined by way of a sulfur atom (i.e., —S-(haloalkyl)). Example of haloalkylthio groups include, but are not limited to, —SCF$_3$, —SCHF$_2$, —SCH$_2$F, —SCH$_2$CF$_3$, and the like.

"Cycloalkyl" refers to alkyl groups forming a ring structure, which can be substituted or unsubstituted, wherein the ring is either completely saturated, partially unsaturated, or fully unsaturated, wherein if there is unsaturation, the conjugation of the pi-electrons in the ring do not give rise to aromaticity. Examples of cycloalkyl include, but are not limited to, cyclopropyl, cyclobutyl, cyclopentyl, cyclohexyl, cycloheptyl, and cyclooctyl groups. In some embodiments, the cycloalkyl group has 3 to 8 ring members (i.e., C$_{3-8}$cycloalkyl), whereas in other embodiments the number of ring carbon atoms range from 3 to 5 members (i.e., C$_{3-5}$cycloalkyl), 3 to 6 members (i.e., C$_{3-6}$cycloalkyl), or 3 to 7 members (i.e., C$_{3-7}$cycloalkyl). Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like.

"Halocycloalkyl" refers to a cycloalkyl as defined above with one or more hydrogen atoms replaced with halogen. Examples of halocycloalkyl groups include, but are not limited to, 2-fluorocyclopropyl, 2-fluorocyclobutyl, 3-fluorocyclobutyl, 2-fluorocyclopentyl, 3-fluorocyclopentyl, 2-fluorocyclohexyl, 3-fluorocyclohexyl, 4-fluorocyclohexyl, 2,2,-difluorocyclopropyl, 2,3-difluorocyclopropyl, and the like.

In another embodiment, an emulsifiable concentrate is provided, wherein R$^1$, R$^2$, R$^4$, and R$^6$ are each, independently, C$_{1-4}$alkyl; R$^3$, R$^5$, and R$^7$ are each, independently, H, C$_{1-4}$alkyl, or C$_{1-4}$haloalkyl; R$^8$ is halo, C$_{1-4}$alkyl, or C$_{1-4}$haloalkyl; and n is 0 to 3 of the structure of formula (I).

In another embodiment, an emulsifiable concentrate is provided wherein R$^1$, R$^2$, R$^4$, and R$^6$ of the structure of formula (I) are each methyl. In one embodiment, R$^3$ is H.

In another embodiment, an emulsifiable concentrate is provided wherein R$^7$ of the structure of formula (I) is methyl, difluoromethyl, or trifluoromethyl.

In another embodiment, an emulsifiable concentrate is provided wherein R$^5$ of the structure of formula (I) is H or methyl.

In another embodiment, an emulsifiable concentrate is provided wherein n of the structure of formula (I) is 1 to 3. In one embodiment, when n is 1 to 3, at least one R$^8$ is halo. In one embodiment, R$^8$ is F.

In one embodiment, an emulsifiable concentrate is provided wherein the aminoindane amide of formula (I) is

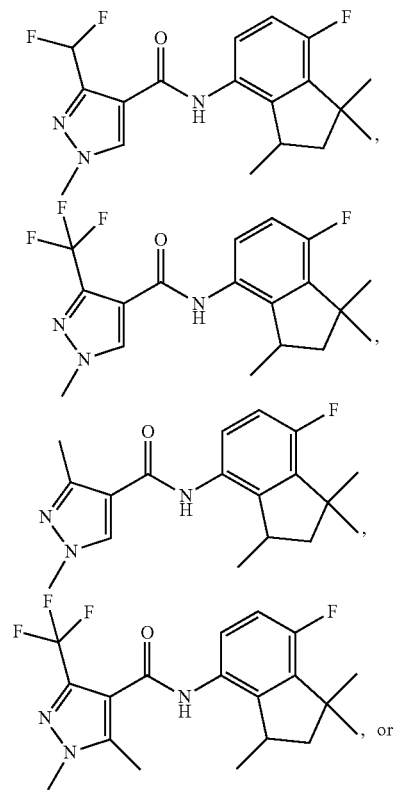

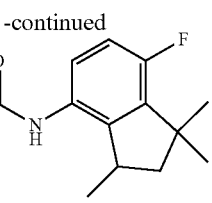

In a preferred embodiment, the aminoindane amide of formula (I) is fluindapyr:

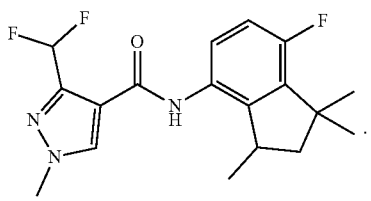 [SMILES: CC1CC(C)(C)c2c(F)ccc(NC(=O)c3cn(C)nc3C(F)F)c21]

In another embodiment, an emulsifiable concentrate is provided wherein n of the structure of formula (I) is 0. In one embodiment where n is 0, the aminoindane amide of formula (I) is

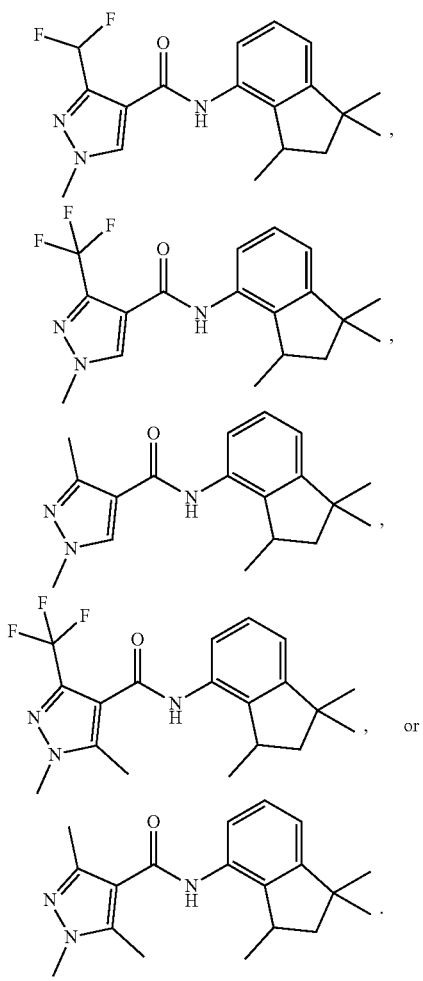

In another embodiment, an emulsifiable concentrate is provided comprising an amide having the structure of formula (II), wherein $R^{12}$ and the $R^{13}$ are each methyl.

In another embodiment, an emulsifiable concentrate is provided comprising an amide having the structure of formula (II), wherein $R^{11}$ is $C_{7-11}$alkyl.

In one embodiment, the amide having the structure of formula (II) is

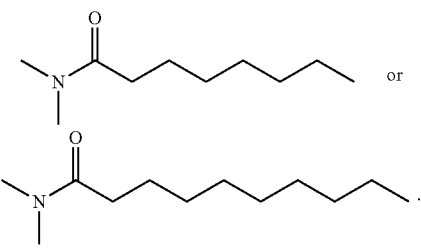

In one embodiment, an emulsifiable concentrate is provided comprising a mixture of at least two amide compounds of formula (II). In one embodiment, the mixture of at least two amide compounds of formula (II) is:

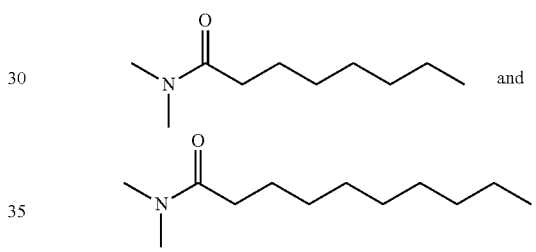

at ratio of 0.1:99.9 wt % to 99.9:0.1 wt %. In one embodiment, the two amide compounds of formula (II) are present at a ration of 10:90 wt % to 90:10 wt %. In another embodiment, the two amide compounds of formula (II) are present at a ration of 20:80 wt % to 80:20 wt %. In another embodiment, the two amide compounds of formula (II) are present at a ration of 25:75 wt % to 75:25 wt %. In another embodiment, the two amide compounds of formula (II) are present at a ration of 40:60 wt/o to 60:40 wt %. In another embodiment, the two amide compounds of formula (II) are present at a ration of 50:50 wt %.

In one embodiment, an emulsifiable concentrate is provided wherein the aminoindane amide of formula (I) is fluindapyr; and the amide of formula (II) is N,N-dimethyldecanamide or N,N-dimethyloctanamide, or a mixture thereof.

In one embodiment, an emulsifiable concentrate is provided comprising an aminoindane amide having the structure of formula (I), an amide having the structure of formula (II), and an azole compound having fungicidal or insecticidal activity. In one embodiment, the azole compound is cyproconazole, difenoconazole, epoxyconazole, flutriafol, penconazole, prochloraz, prothioconazole, tebuconazole, or tetraconazole. In a preferred embodiment, the azole compound is prothioconazole.

In one embodiment, an emulsifiable concentrate is provided with fluindapyr; N,N-dimethyldecanamide or N,N-dimethyloctanamide, or a mixture thereof; and prothioconazole.

In another embodiment, an emulsifiable concentrate is provided wherein the aminoindane amide of formula (I) is present from about 1 wt % to about 20 wt %. In one embodiment, the aminoindane amide of formula (I) is present from about 10 wt % to about 18 wt %. In one embodiment, the aminoindane amide of formula (I) is present at about 14 wt %. In one embodiment, the aminoindane amide of formula (I) is fluindapyr.

In another embodiment, an emulsifiable concentrate is provided wherein the aminoindane amide of formula (I) is present at a concentration of at least about 100 g/L. In one embodiment, the aminoindane amide of formula (I) is present at a concentration of at least about 120 g/L. In one embodiment, the aminoindane amide of formula (I) is present at a concentration of at least about 140 g/L. In one embodiment, the aminoindane amide of formula (I) is fluindapyr.

In another embodiment, the emulsifiable concentrate is provided with an azole compound present from about 1 wt % to about 20 wt %. In one embodiment, the azole compound is present from about 10 wt % to about 18 wt %. In one embodiment, the azole compound is present at about 14 wt %. In one embodiment, the azole compound is prothioconazole.

In another embodiment, the emulsifiable concentrate is provided wherein the azole compound is present at a concentration of at least 100 g/L. In one embodiment, the azole compound is present at a concentration of at least 120 g/L. In one embodiment, the azole compound is present at a concentration of at least 140 g/L. In one embodiment, the azole compound is prothioconazole.

In one embodiment, an emulsifiable concentrate is provided with fluindapyr present at about 14 wt % and prothioconazole present at about 14 wt %.

In one embodiment, an emulsifiable concentrate is provided with fluindapyr present at a concentration of at least about 140 g/L and prothioconazole present at a concentration of at least about 140 g/L.

In another embodiment, the emulsifiable concentrate is a homogeneous solution. In one embodiment, the emulsifiable concentrate is emulsified in water. In one embodiment, the emulsifiable concentrate is emulsified in water with a dilution of at least 0.25%. In another embodiment, the emulsifiable concentrate is emulsified in water with a dilution of at least 1.0%. In another embodiment, the emulsifiable concentrate is emulsified in water with a dilution of at least 2.0%. In one embodiment, the formulation in water is substantially free from crystal formation by the aminoindane amide of formula (I). In another embodiment, the formulation in water is substantially free from crystal formation by the azole compound.

In one embodiment, a method of controlling pathogenic fungi in agricultural crops is provided by applying an effective dose of the emulsifiable concentrate of the present invention on a plant to be protected, on seeds of a plant to be protected before sowing, or on the ground before sowing seeds of a plant to be protected. In one embodiment, the applying is done by spraying.

In one embodiment, a method of controlling harmful insects in agricultural crops is provided by applying an effective dose of the emulsifiable concentrate of the present invention on a plant to be protected, on seeds of a plant to be protected before sowing, or on the ground before sowing seeds of a plant to be protected. In one embodiment, the applying is done by spraying.

The invention furthermore relates to a method for controlling phytopathogenic fungi and/or undesired vegetation and/or undesired attack by insects or mites and/or for regulating the growth of plants, where the concentrate according to the invention or the emulsion according to the invention is allowed to act on the respective pests, their environment or on the crop plants to be protected from the respective pests, on the soil and/or on undesired plants and/or on the crop plants and/or their environment. In general, the therapeutic treatment of humans and animals is excluded from the method for controlling phytopathogenic fungi and/or undesired vegetation and/or undesired attack by insects or mites and/or for regulating the growth of plants.

When employed in crop protection, the application rates of the active fungicides amount to from 0.001 to 2 kg per ha, preferably from 0.005 to 2 kg per ha, especially preferably from 0.01 to 0.2 kg per ha and in particular from 0.03 to 0.1 kg per ha, depending on the nature of the desired effect. In treatment of plant propagation materials such as seeds, e.g. by dusting, coating or drenching seed, amounts of active substance of from 0.0001 to 1 kg, preferably from 0.001 to 1 kg, more preferably from 0.001 to 0.1 kg and most preferably from 0.005 to 0.1 kg, per 100 kg of plant propagation material (preferably seed) are generally required. When used in the protection of materials or stored products, the amount of active substance applied depends on the kind of application area and on the desired effect. Amounts customarily applied in the protection of materials are $1 \times 10^{-6}$ kg to 2 kg, preferably $5 \times 10^{-6}$ kg to 1 kg, of active substance per cubic meter of treated material.

Various types of oils, adjuvants, fertilizers or micronutrients and further pesticides (for example herbicides, insecticides, fungicides, growth regulators, safeners) may be added to the emulsion in the form of a premix or optionally only shortly before use (tank mix). These agents can be admixed to the compositions according to the invention at a weight ratio of from 1:100 to 100:1, preferably from 1:10 to 10:1.

The user applies the composition according to the invention in one embodiment from a predosage device, a knapsack sprayer, a spray tank, a spray plane, or an irrigation system. In one embodiment, the agrochemical composition is made up with water, buffer, and/or further auxiliaries to the desired application concentration and the ready-to-use spray liquor or the agrochemical composition according to the invention is thus obtained. In one embodiment, 20 to 2000 liters, preferably 50 to 400 liters, of the ready-to-use spray liquor are applied per hectare of agricultural useful area.

Advantages of the present invention are, inter alia, that the concentrate is highly stable to low temperatures (e.g. even below 0° C.); that the active ingredients do not precipitate, cream, or crystallize in the concentrate at low temperatures (e.g. even below 0° C.); that the active ingredients do not precipitate, cream, or crystallize in the emulsion obtained from the concentrate, e.g. at low temperatures (even below 0° C.); that high active ingredient concentrations in the concentrate can be employed; that an emulsion forms spontaneously upon dilution of the concentrate with water; that the concentrate is capable of being stored over prolonged periods; that the concentrate does not require the presence of water (e.g. because it might freeze below 0° C. or would favor bacterial growth during storage); that the concentrate forms a stable emulsion upon dilution with water; that adjuvants (such as alcohol alkoxylates) can be included in the concentrate formulations; that the pesticide dose in the emulsion obtained from the concentrate does not clog any spraying filters or nozzles, e.g. at low temperatures, or when diluted with hard water.

EXAMPLES

The invention is further illustrated by the following examples. The examples below are non-limiting are merely representative of various aspects of the invention. Solid and dotted wedges within the structures herein disclosed illustrate relative stereochemistry, with absolute stereochemistry depicted only when specifically stated or delineated.

Example 1

Solubility of Fluindapyr

In order to test the solubility of an active ingredient comprising an aminoindane amide active compound, fluindapyr was added into a test solvent at the concentration of 140 g/L under sufficient agitation. The test solvents were selected based on Hansen Solubility Parameters with a Relative Energy Difference (RED) of between 0.7 and 1.6. The completed dissolved solutions were further stored for one week at 0° C. to check if any crystals grew or not under the storage condition. A solution without crystal growth under the storage condition was considered a Pass, as indicated in Table 1.

TABLE 1

| Solvent | Dissolution |
| --- | --- |
| acetonitrile | FAIL |
| dibutyl ether | FAIL |
| dimethyl formamide | FAIL |
| dimethyl sulfoxide | FAIL |
| methyl alcohol | FAIL |
| methyl ethyl ketone | FAIL |
| methyl isobutyl ketone | FAIL |
| N-butyl acetate | FAIL |
| N-heptane | FAIL |
| O-dichlorobenzene | FAIL |
| perchloroethylene | FAIL |
| propylene carbonate | FAIL |
| propylene glycol | FAIL |
| tetrahydrofuran | FAIL |
| toluene | FAIL |
| ethylene glycol monobutyl ether | FAIL |
| 2-ethylhexanol | FAIL |
| diethylene glycol n-butyl ether acetate | FAIL |
| ethylene glycol n-butyl ether acetate | FAIL |
| diisobutyl ketone | FAIL |
| dipropyleneglycol phenyl ether | FAIL |
| dipropylene glycol methyl ether acetate | FAIL |
| dipropylene glycol n-butyl ether | FAIL |
| dipropylene glycol n-propyl ether | FAIL |
| ethylene glycol phenyl ether | FAIL |
| propylene glycol diacetate | FAIL |
| propylene glycol monomethyl ether acetate | FAIL |
| propylene glycol n-butyl ether | FAIL |
| propylene glycol phenyl ether | FAIL |
| tripropylene glycol n-butyl ether | FAIL |
| isobutyl heptyl ketone | FAIL |
| POWERBLOX SV-17 | FAIL |
| ethoxytriglycol | FAIL |
| diethylene glycol monoethyl ether | PASS |
| dimethyl sulfoxide | PASS |
| diethylene glycol monomethyl ether | PASS |
| N,N-dimethyldecanamide | PASS |

Example 2

Solubility of Fluindapyr/Prothioconazole Blend

In order to test the solubility of an active ingredient combination comprising an aminoindane amide active compound and an azole active compound, 3.5 g of fluindapyr and 3.5 g of prothioconazole were added to a glass jar. For each sample, 15.5 g of the respective solvents listed in Table 2 was added to the jar. Each sample was initially mixed using magnetic stirrers, and the samples were placed onto rollers to aid dissolution.

Solvents that appeared to dissolve the fluindapyr and prothioconazole at room temperature were transferred to an incubator overnight at −10° C.

Solvents that did not dissolve the fluindapyr and prothioconazole separated as soon as agitation was halted. These samples were transferred to an incubator at 54° C. overnight.

TABLE 2

| Solvent | Soluble at Room Temp. | Soluble at 54° C. | Soluble at −10° C. Overnight | PASS/FAIL |
| --- | --- | --- | --- | --- |
| Solvesso 150 | No | Partial | N/A | FAIL |
| Rhodiasolv RPDE | No | Partial | N/A | FAIL |
| N,N-dimethyldecanamide | Yes | N/A | No Change | PASS |
| Acetophone | Yes | NIA | Crystallised | FAIL |
| diisopropylamine | No | Partial | N/A | FAIL |
| Agnique ME 610-G | No | Partial | N/A | FAIL |
| 50:50-75:25 N,N-dimethyloctanamide: N,N-dimethyldecanamide | Yes | N/A | No Change | PASS |
| Prifer 6813 | No | Partial | N/A | FAIL |
| Stepan C-25 | No | Partial | N/A | FAIL |
| 20:80-30:70 methyl myristate: methyl laurate | No | Partial | N/A | FAIL |
| Calprint 35 | No | No | N/A | FAIL |
| Alkyl Benzene | No | No | N/A | FAIL |

Example 3

Dilution of Fluindapyr/Prothioconazole Blend

A solution containing both 14 wt % fluindapyr and 14 wt % prothioconazole was diluted in tap water at 0.25%, or 1.0% or 2.0% v/v, respectively. The dilution was kept 24 hours at room temperature to evaluate for crystal growth. If there was no observed crystal growth, it was considered a Pass. Otherwise, a Failure, as indicated in Table 3.

TABLE 3

| Blend | Solvent | 0.25% Dilution | 1.0% Dilution | 2.0% Dilution |
| --- | --- | --- | --- | --- |
| 14 wt % fluindapyr: 14 wt % prothioconazole | diethylene glycol monoethyl ether | FAIL | FAIL | FAIL |
| 14 wt % fluindapyr: 14 wt % prothioconazole | dimethyl sulfoxide | FAIL | FAIL | FAIL |
| 14 wt % fluindapyr: 14 wt % prothioconazole | diethylene glycol monomethyl ether | FAIL | FAIL | FAIL |
| 14 wt % fluindapyr: 14 wt % prothioconazole | N,N-dimethyldecanamide | PASS | PASS | PASS |

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An emulsifiable concentrate comprising:
   a) an aminoindane amide having the structure of formula (I):

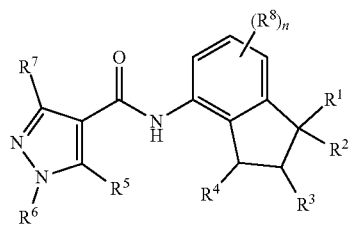

wherein
   $R^1$, $R^2$, $R^4$ and $R^6$ are each methyl;
   $R^3$ is H;
   $R^5$ is H or methyl;
   $R^7$ is methyl, difluoromethyl or trifluoromethyl;
   $R^8$ is F; and
   n is 1 to 3; and
   b) an amide having the structure of formula (II):

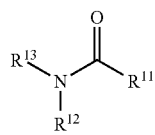

wherein
   $R^{11}$ is $C_{5-19}$alkyl;
   $R^{12}$ is $C_{1-4}$alkyl; and
   $R^{13}$ is $C_{1-4}$alkyl.

2. The emulsifiable concentrate of claim 1, wherein the aminoindane amide having the structure of formula (I) is

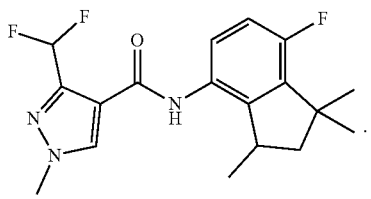 [SMILES: CC1CC(C)(C)c2c(F)ccc(NC(=O)c3cn(C)nc3C(F)F)c21]

3. The emulsifiable concentrate of claim 1, wherein R12 and R13 are each methyl.

4. The emulsifiable concentrate of claim 1, wherein R11 is C7-11 alkyl.

5. The emulsifiable concentrate of claim 1, wherein the amide having the structure of formula (II) is

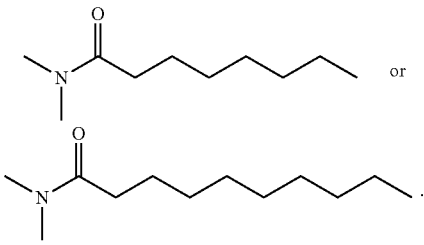

6. The emulsifiable concentrate of claim 1, comprising a mixture of at least two amides having the structure of formula (II).

7. The emulsifiable concentrate of claim 6, wherein the mixture of at least two amides having the structure of formula (II) comprises:

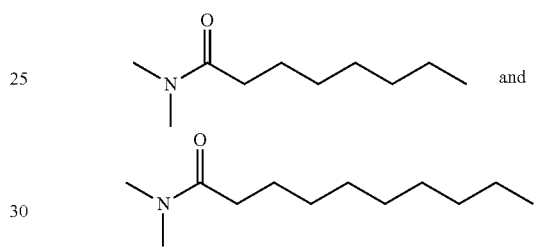

at ratio of 0.1:99.9 wt % to 99.9:0.1 wt %.

8. The emulsifiable concentrate of claim 1, wherein the aminoindane amide having the structure of formula (I) is fluindapyr; and the amide having the structure of formula (II) is N,N-dimethyldecanamide, N,N-dimethyloctanamide, or a mixture thereof.

9. The emulsifiable concentrate of claim 1, further comprising an azole compound having fungicidal or insecticidal activity.

10. The emulsifiable concentrate of claim 9, wherein the azole compound is cyproconazole, difenoconazole, epoxyconazole, flutriafol, penconazole, prochloraz, prothioconazole, tebuconazole, or tetraconazole.

11. The emulsifiable concentrate of claim 9, wherein the azole compound is prothioconazole.

12. The emulsifiable concentrate of claim 9, wherein the aminoindane amide having the structure of formula (I) is fluindapyr; the amide having the structure of formula (II) is N,N-dimethyldecanamide, N,N-dimethyloctanamide, or a mixture thereof; and the azole compound is prothioconazole.

13. The emulsifiable concentrate of claim 1, wherein the aminoindane amide having the structure of formula (I) is present from about 1 wt % to about 20 wt %.

14. The emulsifiable concentrate of claim 1, wherein the aminoindane amide having the structure of formula (I) is present from about 10 wt % to about 18 wt %.

15. The emulsifiable concentrate of claim 1, wherein the aminoindane amide having the structure of formula (I) is present at about 14 wt %.

16. The emulsifiable concentrate of claim 13, wherein the aminoindane amide having the structure of formula (I) is fluindapyr.

17. The emulsifiable concentrate of claim 9, wherein the azole compound is present from about 1 wt % to about 20 wt %.

18. The emulsifiable concentrate of claim 9, wherein the azole compound is present from about 10 wt % to about 18 wt %.

19. The emulsifiable concentrate of claim 9, wherein the azole compound is present at about 14 wt %.

20. The emulsifiable concentrate of claim 17, wherein the azole compound is prothioconazole.

21. The emulsifiable concentrate of claim 12, wherein fluindapyr is present at about 14 wt % and prothioconazole is present at about 14 wt %.

22. The emulsifiable concentrate of claim 1, wherein the aminoindane amide having the structure of formula (I) is present at a concentration of at least about 100 g/L.

23. The emulsifiable concentrate of claim 1, wherein the aminoindane amide having the structure of formula (I) is present at a concentration of at least about 120 g/L.

24. The emulsifiable concentrate of claim 1, wherein the aminoindane amide having the structure of formula (I) is present at a concentration of at least about 140 g/L.

25. The emulsifiable concentrate of claim 22, wherein the aminoindane amide having the structure of formula (I) is fluindapyr.

26. The emulsifiable concentrate of claim 9, wherein the azole compound is present at a concentration of at least 100 g/L.

27. The emulsifiable concentrate of claim 9, wherein the azole compound is present at a concentration of at least 120 g/L.

28. The emulsifiable concentrate of claim 9, wherein the azole compound is present at a concentration of at least 140 g/L.

29. The emulsifiable concentrate of claim 26, wherein the azole compound is prothioconazole.

30. The emulsifiable concentrate of claim 12, wherein fluindapyr is present at a concentration of at least about 140 g/L and prothioconazole is present at a concentration of at least about 140 g/L.

31. The emulsifiable concentrate of claim 1, wherein the concentrate is a homogeneous solution.

32. A formulation comprising the emulsifiable concentrate of claim 1 emulsified in water.

33. The formulation of claim 32, wherein the emulsifiable concentrate is emulsified in water with a dilution of at least 0.25% v/v.

34. The formulation of claim 32, wherein the emulsifiable concentrate is emulsified in water with a dilution of at least 1.0% v/v.

35. The formulation of claim 32, wherein the emulsifiable concentrate is emulsified in water with a dilution of at least 2.0% v/v.

36. The formulation of claim 32, wherein the formulation is free from crystal formation by the aminoindane amide having the structure of formula (I).

37. A formulation comprising the emulsifiable concentrate of claim 9 emulsified in water.

38. The formulation of claim 37 wherein the formulation is free from crystal formation by the azole compound.

* * * * *